US008644258B2

(12) United States Patent
Lei (10) Patent No.: US 8,644,258 B2
(45) Date of Patent: Feb. 4, 2014

(54) METHOD AND APPARATUS FOR REDUCING BREAK DURATION IN HANDOVER OF VOIP CONVERSATION

(75) Inventor: Zhengxiong Lei, Shanghai (CN)

(73) Assignee: Alcatel Lucent, Paris (FR)

( * ) Notice: Subject to any disclaimer, the term of this patent is extended or adjusted under 35 U.S.C. 154(b) by 177 days.

(21) Appl. No.: 13/389,379

(22) PCT Filed: Aug. 7, 2009

(86) PCT No.: PCT/CN2009/073143
§ 371 (c)(1),
(2), (4) Date: Feb. 7, 2012

(87) PCT Pub. No.: WO2011/014992
PCT Pub. Date: Feb. 10, 2011

(65) Prior Publication Data
US 2012/0134340 A1    May 31, 2012

(51) Int. Cl.
*H04W 4/00* (2009.01)
(52) U.S. Cl.
USPC ........... 370/331; 370/332; 370/333; 370/334; 455/436; 455/437; 455/438; 455/439; 455/440; 455/441; 455/442; 455/443; 455/444
(58) Field of Classification Search
USPC ........... 370/331–334, 352–357; 455/436–444
See application file for complete search history.

(56) References Cited
U.S. PATENT DOCUMENTS

2008/0232324 A1* 9/2008 Tajima et al. ................. 370/331
2010/0027507 A1* 2/2010 Li et al. ......................... 370/331

FOREIGN PATENT DOCUMENTS

CN       101459940 A    6/2009
WO    WO2009/089987 A1   7/2009

OTHER PUBLICATIONS

3GPP TS 23.216 v.9.0.0 (Jun. 2009), section 6, p. 22-p. 35 (From Applicant's IDS Feb. 7, 2012).*
ETSI TS 123 216 v8.4.0 (Jun. 2009).*

(Continued)

*Primary Examiner* — Mark Rinehart
*Assistant Examiner* — Mang Yeung
(74) *Attorney, Agent, or Firm* — Fay Sharpe LLP (57) ABSTRACT

The invention proposes a method and an apparatus for reducing break duration in handover of a VoIP conversation from a packet switch domain to a circuit switch domain. The main idea is that a synchronization mechanism is introduced between the session handover procedure at IP multimedia subsystem IMS layer and a cell handover procedure at layer 2, so that enable the two handover procedures to start at or almost at the same time. When a Mobile Switching Center MSC server receives a request of handover from the source Mobility Management Entity MME, the time required from the time the MSC server transmitting a message to this message arriving at a remote end user equipment UE is computed first, and then is compared with a predetermined time required from the time the MSC server transmitting a message to this message arriving at the local UE. According to the comparison result, determining an order and time for the MSC server transmitting a request of session handover to the Service Centralization and Continuity Application Server (SCC AS) and transmitting a request of cell handover to the source MME, and transmitting above two requests in according to the order and time, to ensure that the time that the request of session handover arrives at the remote end communication terminal is the same or almost same as the time that the request of cell handover arrives at the local communication terminal.

14 Claims, 7 Drawing Sheets

(56) References Cited

OTHER PUBLICATIONS

PCT International Search Report (PCT/CN2009/073143) (Jul. 2009).*
3GPP, "Technical Specification Group Services and System Aspects; Single Radio Voice Call Continuity (SRVCC) Stage (Release 9)," 3rd Generation Partnership Project, 3GPP TS 23 216 V9.0.0, (Jun. 2009).

International Search Report for PCT/CN2009/073143 dated May 13, 2010.
"3rd Generation Partnership Project; Technical Specification Group Services and System Aspects; Single Radio Voice Call Continuity (SRVCC); Stage 2 (Release 9)," 3GPP TS 23.216 V9.0.0, pp. 1-39, Jun. 2009.

* cited by examiner

METHOD AND APPARATUS FOR REDUCING BREAK DURATION IN HANDOVER OF VOIP CONVERSATION

TECHNICAL FIELD

The invention relates to communication networks, and in particular, relates to a method and apparatus for reducing break duration in handover of a VoIP conversation from a packet switch domain to a circuit switch domain in a communication network.

BACKGROUND

At present, we are experiencing a rapid integration of fixed and mobile networks, while IMS (IP Multimedia Subsystem) is generated under such environment. IMS is a global, independent on access and standard-based IP channel and service control architecture, which enables the terminal users based on ordinary internet protocol to use different types of multimedia services. IMS system not only offers a variety of access modes, but also provides inter-operations with the circuit switch domain. For a multi-mode mobile terminal currently locates in a packet switch domain, it may handover a conversation from a packet switch domain to a circuit switch domain to ensure the quality of the conversation, when it moves to an edge of or outside a network covered by the packet switch domain, or when it is located in a network covered by the circuit switch domain while the network covered currently by the packet switch domain becomes unavailable.

In prior art, if a user terminal can receive and transmit information over a packet switch domain and a circuit switch domain simultaneously, a handover is generally completed before the current connection is released. In other words, the user terminal establishes a call or session in the circuit switch domain and meanwhile maintains the existing voice call in the packet switch domain. The user handovers a voice media to the call or session of the circuit switch domain only after the call or session of the circuit switch domain is established, and then releases network resources in the packet switch domain before the handover. This manner usually has the shortest break duration. However, for the terminals which cannot receive and transmit information over two domains simultaneously, this method is inapplicable.

Therefore, 3GPP TS 23.216 specifies a SRVCC (Single Radio Voice Call Continuity) solution for maintaining voice call continuity between EPS (Evolved Packet System) PS (Packet Switch) access and UTRAN/GERAN (Universal Terrestrial Radio Access Network/GSM EDGE Radio Access Network) CS (Circuit Switch) access for calls that are anchored in IMS system. In this situation, UE (user equipment) is can merely transmit or receive data via one of the preceding two access networks at a given time.

However, SRVCC solution prescribed by the 3GPP TS 23.216 also contains some disadvantages, such as uncertain voice break duration, complex signaling flows, or the like. Why there is uncertain voice break duration will be described in detail in the following.

Figure 1:
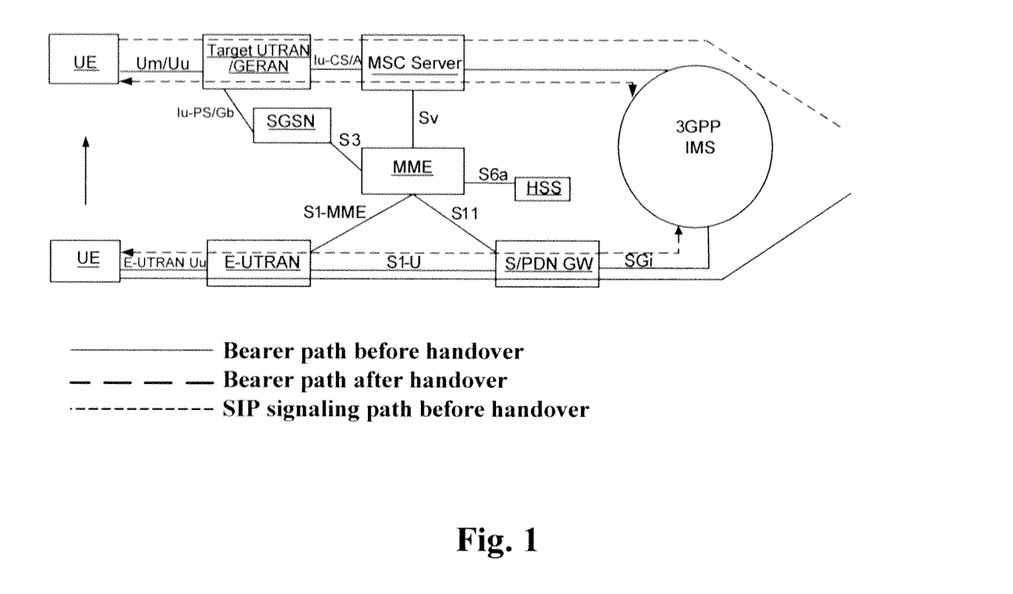
FIG. 1 is the network architecture for SRVCC as prescribed by 3GPP TS 23.216.

FIG. 1 illustrates SRVCC network architecture of a handover of VoIP conversation from E-UTRAN (Evolved UTRAN) to UTRAN/GERAN as prescribed by the 3GPP TS 23.216.

As shown in FIG. 1, UE accesses IMS via E-UTRAN and S-GW/PDN GW. The E-UTRAN is also referred to as LTE (Long Term Evolution), including a plurality of E-Node B in charge of the wireless access network part. EPS conducts a functional integration on NodeB, RNC (Radio Network Controller) and CN (Core Network) in the existing WCDMA and TD-SCDMA systems, and is simplified as two network elements, eNodeB and EPC. EPC comprises MME (Mobility Management Entity) for acting as a control node responsible of signaling processing of the core network, and S-GW (Serving Gateway)/PDN-GW (Packet Data Network Gateway) responsible of data processing of the core network. Wherein, non-3GPP wireless access network may access EPC via PDN-GW, and 3GPP wireless network may access EPC through S-GW.

In addition, FIG. 1 also illustrates interfaces between network elements suggested by the Specification. For example, E-UTRAN connects with EPC via a S1 (similar to Iu) interface. E-UTRANs connect with each other via a X2 (similar to Iur) interface (not shown), and UE connects with E-UTRAN via a LTE-Uu interface.

In the environment shown in FIG. 1. UE may decide to handover to the circuit switch domain provided by UTRAN/GERAN when it is located at an edge of the coverage of E-UTRAN or outside an area covered by E-UTRAN. In UTRAN/GERAN, the UE accesses the IMS network via a base station and a MSC (Mobile Switch Centre) server.

Wherein, UTRAN is a kind of relatively new access network for UMTS, and has now became an important access manner of UMTS, which includes NodeB, RNC, CN, etc. While GERAN is a key part of GSM specified and maintained by 3GPP and also be included in UTMS/GSM network, comprising base stations BSs, base station controllers BSCs and interfaces thereof (e.g. Ater interface, Abis interface, A interface, etc.). Commonly, the network of a mobile operator is composed of a plurality of GERANs, and combined with UTRAN in UMTS/GSM network.

Detailed information regarding the other network elements and the communication manners of the network elements in FIG. 1 can refer to TS23.216.

Figure 2:
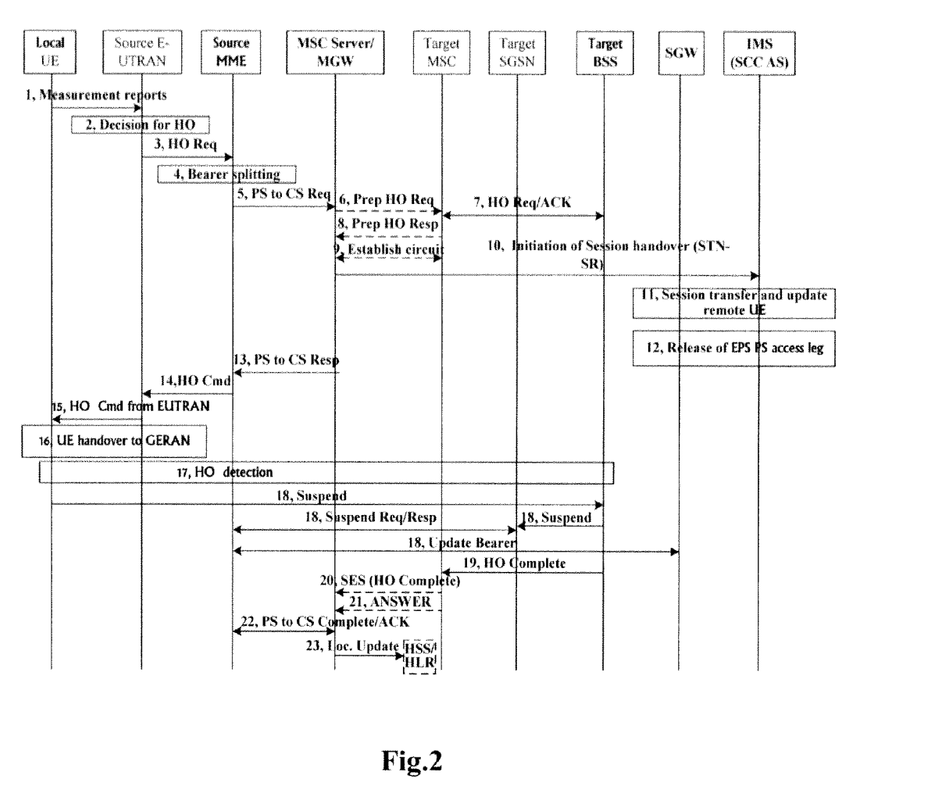
FIG. 2 is related SRVCC flow of a handover from E-UTRAN to target GERAN without the support of DTM/PSHO in prior art.

FIG. 2 shows a call flow for a handover of SRVCC from E-UTRAN to UTRAN/GERAN without DTM/PSHO (Dual Transfer Mode/Pack Switch Handover) support as prescribed by 3GPP TS 23.216. In order to accomplish the handover of voice conversation, the voice conversation needs to be anchored beforehand in IMS, such as on a SCC AS (Service Centralization and Continuity Application Server).

As shown in FIG. 2, when source E-UTRAN decides to perform a handover from a packet domain to a circuit domain on a ongoing VoIP call of a local UE in according to a measurement report received from local/source UE, it sends a handover request to local MME, and then the source MME splits the bearer (used for transferring the voice service subsequently), and sends a corresponding request of handover from the packet domain to the circuit domain to the MSC server or media gateway capable of covering the local UE currently. The corresponding MSC/media gateway initiates a session transfer after a handover preparation and setting up a circuit. Here, it should be noted that, if the target MSC to which the local UE is to be handover and the MSC that received the handover request from the MME are the same MSC, steps 6, 8 and 9 in the dashed part could be omitted (so as steps 20 and 21).

Next, SRVCC contains a session handover procedure at IMS layer and a cell handover procedure to the target cell at layer 2. That is to say, there are two user-plane handovers in the SRVCC.

1) Steps 10 to 12, SCC AS in IMS executes a session handover procedure, updates remote UE (i.e. the counter party that establishes the VoIP conversation with the local UE) with the SDP of the target CS access leg, and releases the source EPC PS access leg. These steps will result in a switch of the voice component of the ongoing conversation from EPC to MGW on user-plane.

2) Steps 15 to 21, a handover from E-UTRAN to UTRAN/GERAN is executed on the local UE and access network. This is a handover between RATs (Radio Access Type) performed at the local UE and access network, and will result in a handover of the local UE from the current E-UTRAN cell to the target UTRAN/GERAN cell.

VoIP call break, namely, voice flow break, will be generated in both of the above two handover procedures. Although each step in FIG. 2 is numbered with successive numbers, however, it does not mean the relationship on time between steps 10-12 and steps 15-21. On contrary, it is entirely possible that steps 10-12 are executed after step 15, or at the same time with step 15. In other words, there is no synchronization between the two handover procedures, which makes the voice break duration become uncontrolled and is uncertain. In the worst case, the voice break duration could be extreme long and deteriorates users' experiences.

Figure 3:
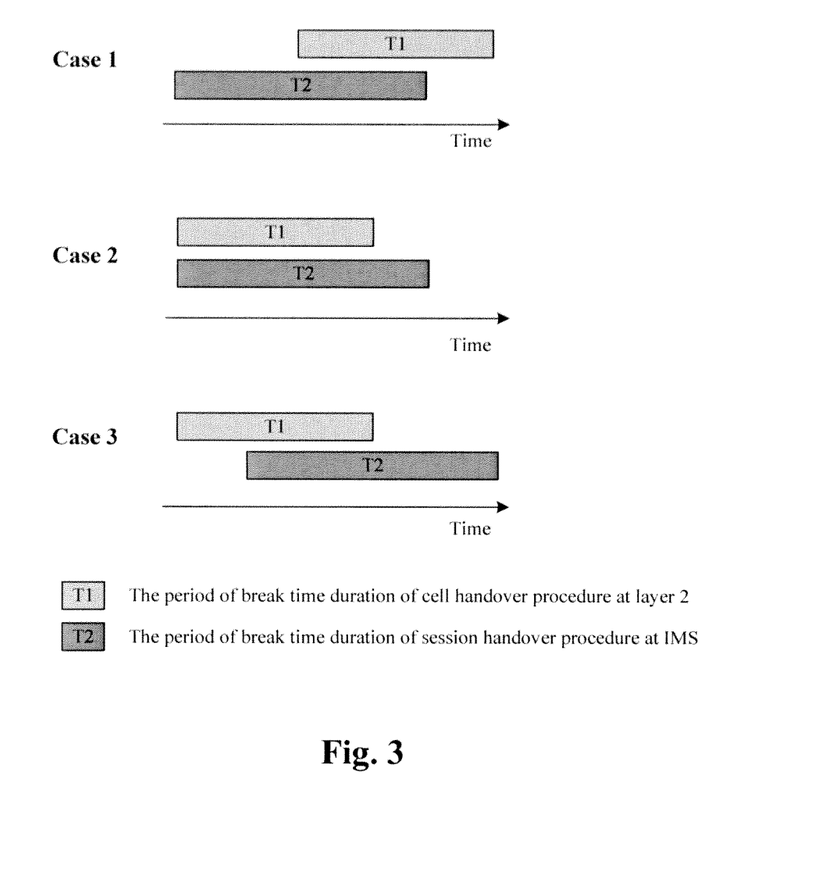
FIG. 3 is a diagram of SRVCC break duration in prior art.

FIG. 3 illustrates the duration of the break of VoIP conversation in the above SRVCC solution. Wherein, T1 represents the break duration of the cell handover procedure at layer 2, and meanwhile indicates the start time and finish time of the break. T2 represents the break duration of the session handover procedure at IMS layer, and meanwhile also indicates the start time and finish time of the break.

Case 1: the break caused by the session handover procedure at IMS layer happens before the break caused by the cell handover procedure. In this case, the break duration generated by SRVCC will greater than the maximum value of T1 and T2, with no greater than T1+T2, and in the worst case, equal to T1+T2.

Case 2: the break caused by the session handover procedure at IMS layer happens at the same time as the break caused by the cell handover procedure. In this case, the break duration generated by SRVCC is equal to the maxi value of T1 and T2.

Case 3: the break caused by the cell handover procedure happens before the break caused by the session handover procedure at IMS layer. In this case, similar as the Case 1, the break duration generated by SRVCC will greater than the maximum value of T1 and T2, with no greater than T1+T2, and in the worst case, equal to T1+T2.

It can thus be seen that the break duration generated in the SRVCC solution proposed in 3GPP TS 23.216 Specification is inconstant and uncontrollable.

SUMMARY

In order to overcome the disadvantages hereinabove in prior art, the invention proposes a method and apparatus for reducing break duration in handover of VoIP conversation.

According to the first aspect of the invention, a method for reducing break duration in handover of VoIP conversation is provided, when a control device in a circuit switch domain receives a request of handover from a control device in a packet switch domain indicating a handover of the current conversation from the packet switch domain to the circuit switch domain, the method comprising: calculation step of calculating a first time duration which is a time required from the time the control device in the circuit switch domain transmitting a message to this message arriving at a remote end communication terminal; comparison step of comparing the calculated first time duration with a predetermined second time duration, the second time duration being a time required from the time the control device in the circuit domain transmitting a message to this message arriving at a local communication terminal; and synchronization step of the control device in the circuit switch domain determining an order and time for transmitting a request of session handover to a device anchoring VoIP conversation and transmitting a request of cell handover to the control device in the packet switch domain, in according to the comparison result of the first time duration and the second time duration, and transmitting the two requests in according to the order and times, to ensure that the request of session handover arrives at the remote end communication terminal at or almost at the same time as the arrival of the request of cell handover at the local communication terminal.

Preferably, said calculation step further comprises the control device in the circuit switch domain transmits a request message of non-session handover request to the device anchoring VoIP conversation; the device anchoring VoIP conversation interacts with the remote end communication terminal after the receipt of the request message; the device anchoring VoIP conversation transmits a reply message to the control device in the circuit switch domain after interacting with the remote end communication terminal; and the control device in the circuit switch domain calculates the first time duration in according to the time of transmitting the request message and the time of receiving the reply message.

Preferably, said calculation step further comprises: according to the time of transmitting the request message and the time of receiving the reply message, the control device in the circuit switch domain calculates the first time duration as a certain proportion of the time duration spanning the two time.

Preferably, said synchronization step further comprises: if the first time duration is longer than the second time duration, the control device in the circuit switch domain transmits a request of session handover to the device anchoring VoIP conversation; the control device in the circuit switch domain initiates a timer with a time interval being the difference of the first time duration and the second time duration; and after the timer expires, the control device in the circuit switch domain transmits a request of cell handover to the control device in the packet switch domain.

Preferably, said synchronization step further comprises: if the first time duration is shorter than the second time duration, then the control device in the circuit switch domain transmits a request of cell handover to the control device in the packet switch domain; the control device in the circuit switch domain initiates a timer with a time interval being the difference of the second time duration and the first time duration; and after the timer expires, the control device in the circuit switch domain transmits a request of session handover to the device anchoring VoIP conversation.

Preferably, said synchronization step further comprise: if the first time duration is equal to the second time duration, then the control device in the circuit switch domain transmits a request of cell handover to the control device in the packet switch domain and a request of session handover to the device anchoring VoIP conversation simultaneously.

According to the second aspect of the invention, an apparatus for reducing break duration in handover of VoIP conversation in a control device in a circuit switch domain is provided, comprising: receiving means for receiving a request of handover from a control device in a packet switch domain, the request indicating a handover of the current conversation from the packet switch domain to the circuit switch domain; calculation means for calculating a first time duration which is the time required from the time the control device in the circuit switch domain transmitting a message to this message arriving at a remote end communication terminal; comparison means for comparing the calculated first time duration with a predetermined second time duration, the second time duration being the time required from the time the control device in the circuit domain transmitting a message to this message arriving at a local communication terminal; synchronization means for determining the order and time for transmitting a request of session handover to a device anchoring VoIP conversation and transmitting a request of cell handover to the control device in the packet switch domain, in according to the comparison result of the comparison means; and transmitting means for transmitting the two requests in according to the order and time determined by the synchronization means for transmitting a request of session handover to the device anchoring VoIP conversation and transmitting a request of cell handover to the control device in the packet switch domain.

Preferably, the transmitting means is further for transmitting a request message of a non-session handover request to the device anchoring VoIP conversation; the receiving means is further for receiving a reply message transmitted by the device anchoring VoIP conversation after interacting with the remote end communication terminal to the control device in the circuit switch domain; and the calculation means is further for calculating the first time duration in according to the time of transmitting the request message and the time of receiving the reply message.

Preferably, the calculation means calculates, in according to the time of transmitting the request message and the time of receiving the reply message, the first time duration as a certain proportion of the time duration spanning the two times.

Preferably, if the comparison result of the comparison means is that the first time duration is longer than the second time duration, the synchronization means triggers the transmitting means to transmit a request of session handover to the device anchoring VoIP conversation; the synchronization means initiates a timer with a time interval being the difference of the first time duration and the second time duration; and the synchronization means triggers the transmitting means to transmit a request of cell handover to the control device in the packet switch domain after the timer expires.

Preferably, if the comparison result of the comparison means is that the first time duration is shorter than the second time duration, the synchronization means triggers the transmitting means to transmit a request of cell handover to the control device in the packet switch domain; the synchronization means initiates a timer with a time interval being the difference of the second time duration and the first time duration; and the synchronization means triggers the transmitting means to transmit a request of session handover to the device anchoring VoIP conversation after the timer expires.

Preferably, if the comparison result of the comparison means is that the first time duration is equal to the second time duration, the synchronization means triggers the transmitting means to transmit a request of cell handover to the control device in the packet switch domain and a request of session handover to the device anchoring VoIP conversation simultaneously.

By the use of the method and apparatus of the invention, a synchronization mechanism is introduced into the two main handover procedures which cause voice break in the SRVCC solution, namely, the session handover procedure at IMS layer and the cell handover procedure at layer 2, resulting in that the break of the two handover procedures happens at or almost at the same time, such that the break of the whole SRVCC procedure becomes controlled and constant, and the duration of the break is shortened to the minimum value, whereby system performance is enhanced and quality of service is apparently improved. In addition, the solution of the invention nearly has no impact on the existing network environment, and thus possesses a high compatibility.

BRIEF DESCRIPTION OF THE DRAWINGS

Other characteristics, objects and advantages of the invention will be more obvious by reading the following detailed description in conjunction with figures non-limited embodiments.

DETAILED DESCRIPTION

Based on the above analysis, it can be seen that the voice break in SRVCC solution given by 3GPP TS 23.216 is generated mainly by two parts, the procedure of session handover at IMS layer and the procedure of cell handover to the target cell at layer 2 (handover executed between local UE and the access network). However, there is no synchronization mechanism between the two procedures, which makes the duration of voice break become uncontrollable with uncertainty. In the worst case, as stated above, the duration of voice break may be too long that users' experiences will be deteriorated extremely. This is caused by the absence of synchronism mechanism between the two procedures of handover. If a synchronism mechanism can be introduced, the duration of voice break will be shortened to a fixed value.

The basic idea of the invention is that a synchronization mechanism is introduced between the session handover procedure at IMS layer and cell handover procedure at layer 2, so that the two handover procedures start simultaneously or almost simultaneously. Thus the break duration of the whole SRVCC will be a minimum constant value as in Case 2 hereinabove.

For this purpose, a value P2 is required to be predetermined in MSC server, representing the average time required from the MSC server transmitting a PS to CS Response message to the MME, to the local UE finally receiving a HO Command from EUTRAN. Such average time mainly comprise two parts, the total processing time on the message by the communication nodes that the message passes by, and the required time of transmission of the message in networks. Since the number of nodes the message passed by in its delivery to UE is fixed, the time required by those nodes to process the message can be computed. In addition, as both the MSC server and the local UE are located in the same local network, and the distance passed by the message from the MSC server to the UE in the local network does not have many changes, the time required for the transmission of the message in the network does not have many changes, too, and can be estimated based on experiences. Thus we can see that the time required from the message being sent by the MSC server to the message finally arriving at the local UE can be calculated and estimated based on experiences, thus P2 can be assumed in advance.

Figure 4:
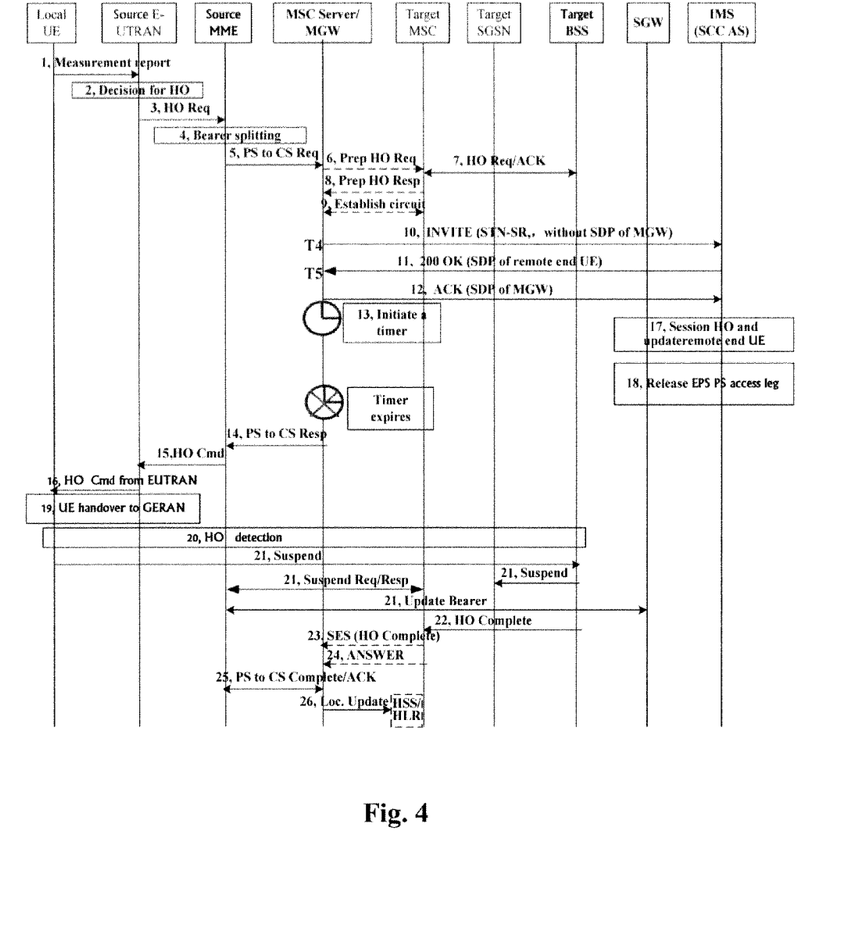
FIG. 4 is an illustrative flow chart of an improved SRVCC according to an embodiment of the invention.
Figure 5:
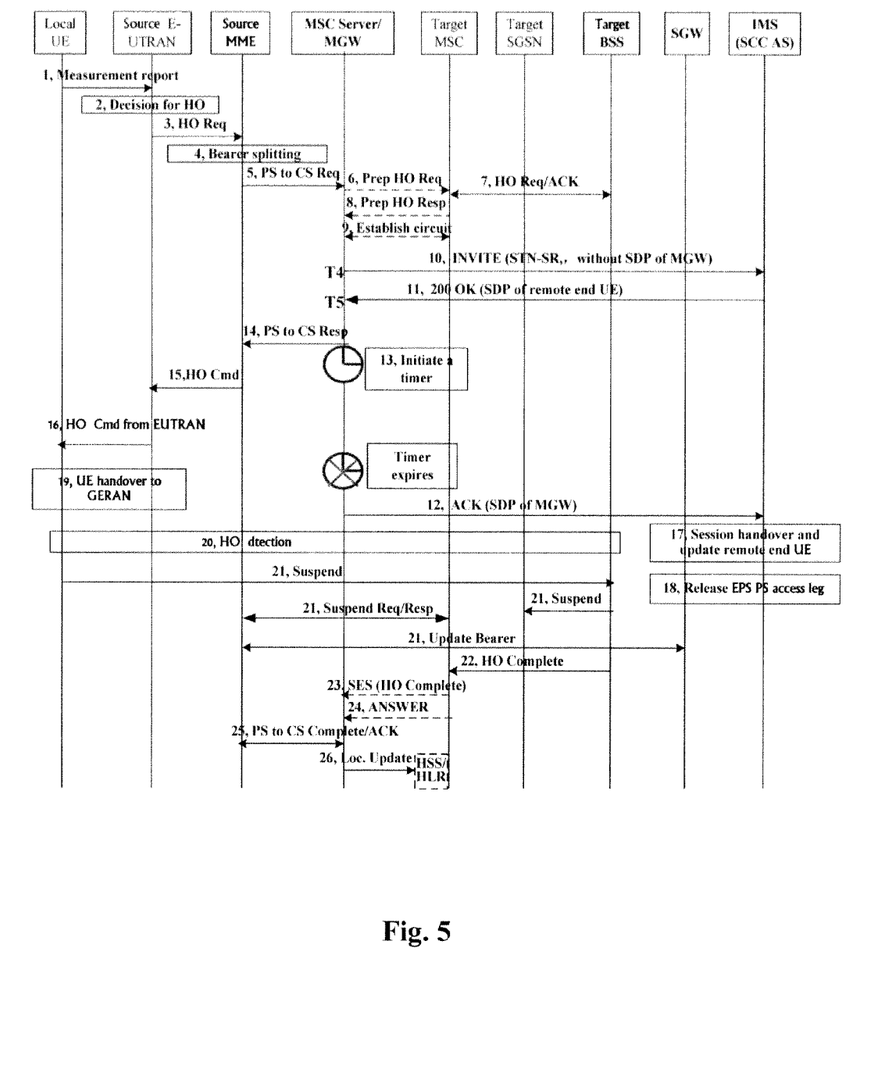
FIG. 5 is an illustrative flow chart of an improved SRVCC according to an embodiment of the invention.
Figure 6:
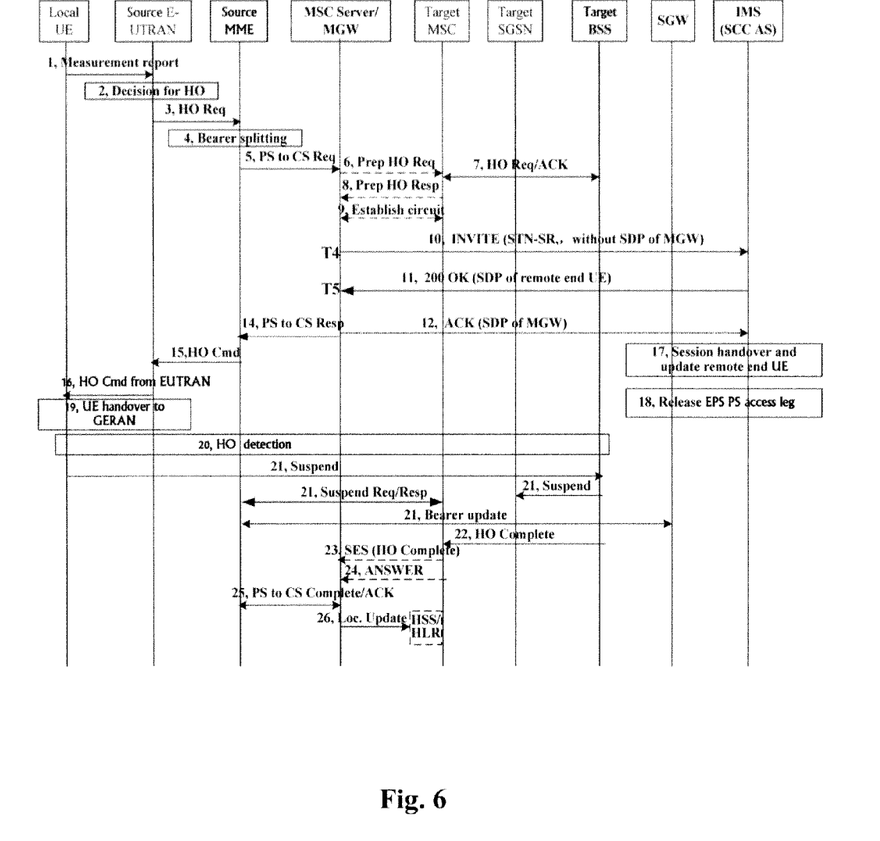
FIG. 6 is an illustrative flow chart of an improved SRVCC according to an embodiment of the invention.

FIGS. 4, 5 and 6 illustrate improved SRVCC flows according to specific embodiments of the invention. It should be noted that although each step shown in the figure is numbered with successive numbers, it does not mean the order of execution of each step. It can be seen that steps 1-9 are the same with steps 1-9 in FIG. 2.

The difference is that, in step 10 of FIGS. 4, 5 and 6, the INVITE message sent by the MSC server to the SCC AS in the IMS does not contain SDP information of MGW, and meanwhile, the MSC server records the time when it transmits the INVITE message as T4. Upon receipt of the INVITE message, the SCC AS interacts with the remote end UE (not shown in the figures), and then transmits a 200 OK reply message to the MSC server, wherein SDP information of the remote end UE is included therein. Because the remote end UE does not obtain the SDP information of MGW, the handover procedure of the remote end UE cannot be initiated, and the media stream of the current session is still kept as connected till now. The MSC server records the time when it receives the 200 OK message as T5. Then the MSC server calculates the time P1 it requires to transmit a message to the remote end UE according to the round trip of the above message, e.g. calculating P1 as a certain proportion of the time duration between time T4 and T5, wherein the proportion can be set in according to experiences and network conditions, such as 50% or 45%. Steps 10-11 aims to calculate P1, however, the calculation of P1 is not limited to the preceding INVITE-200 OK message pair, but may employ other messages, like INVITE-183 temporary response message.

It should be noted that the INVITE message in step 10 of FIG. 2 is a request of session handover, and since it contains SDP information of MGW, a session handover procedure will be initiated by the remote end UE once it receives this INVITE message via the SCC AS. However, the INVITE message in step 10 of FIGS. 4, 5 and 6 is a request message of non-session handover request, because it does not contain SDP information of MGW, thus the remote end UE cannot initiate a session handover procedure after receiving the INVITE message via the SCC AS. The INVITE message is mainly used for computing the value of P1.

After calculating P1, the MSC server will compare P1 with the predetermined P2. The MSC server will conduct different actions based on different comparison results.

If P1 is greater than P2, i.e., the time required from the time the MSC server transmitting a message to this message arriving at the remote end UE is longer than the time required from the time the MSC server transmitting a message to this message arriving at the local UE, then subsequent flow is as shown in FIG. 4. The MSC server transmits a request of session handover to the SCC AS first, such as the ACK message as shown in step 12 of FIG. 4, the message has SDP information of MGW therein. At the same time, the MSC server initiates a timer with a time interval of P1-P2. Upon receipt of the ACK message with SDP information of MGW, based on this ACK message, the SCC AS immediately transmits a ACK message to the remote UE to initiate a session handover procedure and updates the remote end UE, and subsequent procedure is similar as the one defined by the existing 3GPP TS 23.216 specification. After the timer expires, the MSC server will transmit a request of cell handover to the source MME, such as the PS to CS Response message as shown in step 14 of FIG. 4. Then steps 15 and 16 are executed, thereby initiating a cell handover procedure of handover to the target cell at the local UE side, and the subsequent procedure is the same with prior art.

If P2 is greater than P1, i.e., the time required from the time the MSC server transmitting a message to this message arriving at the local UE is longer than the time required from the time the MSC server transmitting a message to this message arriving at the remote end UE, the following flow is as shown in FIG. 5. The MSC server firstly transmits a request of cell handover to the source MME, such as the PS to CS Response message as shown in step 14 of FIG. 5, then initiates a cell handover procedure at the local UE side, and the subsequent procedure is similar as the one defined by the existing 3GPP TS 23.216 specification. Simultaneously, the MSC server initiates a timer with a time interval of P2-P1. After the timer expires, the MSC server will transmit a request of session handover to the SCC AS in IMS, such as the ACK message as shown in step 12 of FIG. 5, the message has SDP information of MGW therein. Upon receipt of the ACK message with SDP information of MGW, based on this ACK message, the SCC AS immediately transmits a ACK message to the remote UE to initiate a session handover procedure and updates the remote UE, and the subsequent procedure is similar as the one defined by the existing 3GPP TS 23.216 specification.

If P1 is equal to P2, i.e., the time required from the time the MSC server transmitting a message to this message arriving at the local UE is as long as the time required from the time the MSC server transmitting a message to this message arriving at the remote end UE, as shown in FIG. 6, the MSC server transmits a request of session handover to the SCC AS and a request of cell handover to the source MME simultaneously, that is, the ACK message (with SDP information of MGW) as shown in step 12 of FIG. 6 and the PS to CS Response message as shown in step 14 of FIG. 6 are sent at the same time. Upon receipt of the ACK message, based on this ACK message, the SCC AS immediately transmits a ACK message to the remote UE to initiate a session handover procedure and updates the remote UE, and the subsequent procedure is similar as the one defined by the existing 3GPP TS 23.216 specification. The source MME will further initiate a cell handover procedure at the local UE side after receiving the PS to CS Response message.

In this way, the time the request of session handover finally arriving at the remote end UE is the same or almost the same as the time when the request of cell handover finally arriving at the local UE. When the request of session handover reaches the remote UE, the remote UE will update the SDP information of the peer communication entity (namely, the local UE) as SDP information of MGW, and thereby causes start of the break due to the session handover at IMS layer. On the other hand, when the request of cell handover finally reaches the local UE, the break caused by the cell handover at layer 2 will start. Therefore, the break caused by the session handover at IMS layer happens simultaneously or almost simultaneously with the break caused by the cell handover at layer 2, as shown in Case 2 of FIG. 3. In this case, as stated above, the break duration of the whole SRVCC procedure is the shortest.

It has been pointed out above that, if the target MSC to which the local UE is to be handover and the MSC server are the same MSC server, steps 6, 8 and 9 could be omitted. In addition, in order to speed up the handover, the MSC server may transmit the INVITE message to the SCC AS as soon as it receives a PS to CS Req message from the source MME, i.e. executing step 10 after step 5 immediately. In this situation, the MSC must satisfy the following two conditions before executing step 12 (that is, before transmitting the ACK message): 1. having received the 200 OK message in step 11; and 2. having received the message in step 7 when steps 6, 8, 9 are omitted, in other words, the MSC server and the target MSC are the same MSC server; if steps 6, 8, 9 need to be performed, in other words, the MSC server and the target MSC are not the same one, having received the message in step 9.

Figure 7:
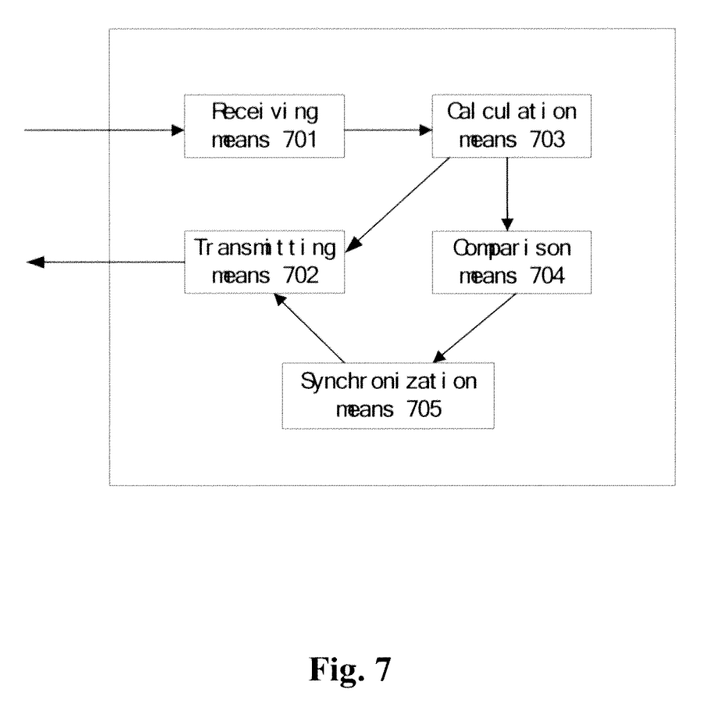
FIG. 7 is an apparatus in MSC server for reducing break duration in handover of VoIP conversation according to an embodiment of the invention.

FIG. 7 illustrates an apparatus in MSC server for reducing break duration in SRVCC according to an embodiment of the invention. Receiving means 701 triggers calculation means 703 to calculate the first time duration P1, i.e., the average time required from the time the MSC server transmitting a message to this message arriving at the remote end UE, when receiving means 701 receives a request of handover from the source MME, such as the PS to CS Req message in step 5 of FIGS. 4-6, wherein the request of handover indicates a handover of the current conversation from a packet switch domain to a circuit switch domain. It should be noted that if the MSC server is different from the target MSC to which the local UE is to be handover, when receiving means 701 receives the PS to CS Req message from the source MME, steps 6, 8 and 9 in FIGS. 4-6 will be executed. However, there is no sequential relation between two groups of actions of the execution of steps 6, 8, 9 and the calculation of the first time duration P1 by calculation means 703, in other words, the calculation of the first time duration P1 by calculation means 703 may be performed simultaneously with step 6. If the MSC server and the target MSC to which the local UE is to be handover are the same one, steps 6, 8 and 9 in FIGS. 4-6 will be omitted, that is, receiving means 701 will trigger calculation means 703 to calculate the first time duration P1 as soon as it receives the PS to CS Req message from the source MME.

Specifically, calculation means 703 informs transmitting means 702 to transmit a request message of non-session handover request to the SCC AS in IMS, such as the INVITE message in step 10 of FIGS. 4-6. Different from the INVITE message in step 10 of FIG. 2, this INVITE message does not contain SDP information of MGW. The calculation means 703 records the time when it transmits the INVITE message as T4. Because fails to obtain SDP information of MGW, the SCC AS cannot initiate a session handover procedure at the remote end UE side after receiving the INVITE message. The SCC AS transmits a 200 OK reply message to the MSC server after interacting with the remote end UE. The MSC server receives this message via the receiving means 701. The receiving means 701 informs this event to the calculation means 703, and records the time when it receives the 200 OK message as T5. The calculation means 703 calculates P1 based on time T4 and T5, e.g. calculating P1 as a certain proportion of the time duration between time T4 and T5, wherein the proportion can be set in according to experiences and network conditions, such as 50% or 45%.

Then calculation means 703 notifies the comparison means 704 of the calculated value of P1. The comparison means 704 compares P1 with the predetermined P2, and informs synchronization means 705 of the comparison result. The synchronization means 705 determines the order and time for transmitting a request of session handover to the SCC AS and transmitting a request of cell handover to the source MME based on the comparison result, to ensure that the request of session handover arrives at the remote end communication terminal at or almost at the same time with the arrival of the request of cell handover at the local communication terminal.

In particular, actions performed by the synchronization means 705 are as follows.

If P1 is greater than P2, i.e., the time required from the time the MSC server transmitting a message to this message arriving at the remote end UE is longer than the time required from the time the MSC server transmitting a message to this message arriving at the local UE, the synchronization means 705 firstly triggers the transmitting means 702 to transmit a request of session handover to the SCC AS, such as the ACK message as shown in step 12 of FIG. 4, the message has SDP information of MGW therein. At the same time, the synchronization means 705 initiates a timer with a time interval of P1-P2. Upon receipt of the ACK message with SDP information of MGW, based on this ACK message, the SCC AS immediately transmits a ACK message to the remote UE to initiate a session handover procedure and update the remote UE, and the subsequent procedure is similar as the one defined by the existing 3GPP TS 23.216 specification. After the timer expires, the synchronization means 705 triggers the transmitting means 702 to transmit a request of cell handover to the source MME, such as the PS to CS Response message as shown in step 14 of FIG. 4, then executes steps 15 and 16, thereby initiating a cell handover procedure of handover to the target cell at the local UE side, and the subsequent procedure is the same with prior art.

If P2 is greater than P1, i.e., the time required from the time the MSC server transmitting a message to this message arriving at the local UE is longer than the time required from the time the MSC server transmitting a message to this message arriving at the remote end UE, the synchronization means 705 firstly triggers the transmitting means 702 to transmit a request of cell handover to the source MME, such as the PS to CS Response message as shown in step 14 of FIG. 5, then initiates a cell handover procedure at the local UE side, and the subsequent process is similar as the one defined by the existing 3GPP TS 23.216 specification. Simultaneously, the synchronization means 705 initiates a timer with a time interval of P2-P1. After the timer expires, the synchronization means 705 triggers the transmitting means 702 to transmit a request of session handover to the SCC AS in IMS, such as ACK message as shown in step 12 of FIG. 5, this message carrying SDP information of MGW. Upon receipt of the ACK message with SDP information of MGW, based on this ACK message, the SCC AS immediately transmits a ACK message to the remote UE to initiate a session handover procedure and update the remote UE, and the subsequent process is similar as the one defined by the existing 3GPP TS 23.216 specification.

If P1 is equal to P2, i.e., the time required from the time the MSC server transmitting a message to this message arriving at the local UE is as long as the time required from the time the MSC server transmitting a message to this message arriving at the remote end UE, the synchronization means 705 triggers the transmitting means 702 to transmit a request of session handover to the SCC AS and a request of cell handover to the source MME simultaneously, that is, the ACK message (with SDP information of MGW) as shown in step 12 of FIG. 6 and the PS to CS Response message as shown in step 14 of FIG. 6 are sent at the same time. Upon receipt of the ACK message, the SCC AS immediately transmits a ACK message to the remote UE based on said ACK message to initiate a session handover procedure and update the remote UE, and the subsequent procedure is similar as the one defined by the existing 3GPP TS 23.216 specification. The source MME will further initiate a cell handover procedure at the local UE side after receiving the PS to CS Response message, and the subsequent process is the same with prior art.

Although above illustrates the basis idea of the invention by taking the 3GPP TS 23.216 as application environment and employing entities such as MME, MSC sever, MGW or the like, the application of the invention is not limited to this. For example, the invention may also be applied to 3GPP TS 23.237, 23.292, etc. In fact, all the entities capable of providing corresponding management/control on VoIP calls in a packet switch domain can act as the MME aforementioned; all the entities capable of providing corresponding management/control on VoIP calls in the circuit switch domain, such as MGW, MSC server managing/processing media or the like, can act as the corresponding control unit in the circuit switch domain; and all the entities capable of anchoring calls of users can act as the SCC AS above.

Specific embodiments of the invention have been described hereinabove. It should be understood that the invention is not limited to above specific embodiments, and those skilled in the art may make various modifications and adaptations within the scope of the appended claims.

What is claimed is:

1. A method for reducing break duration in a handover of a VoIP conversation, when a control device in a circuit switch domain receives a request of handover from a control device in a packet switch domain indicating a handover of a current conversation from the packet switch domain to the circuit switch domain, comprising:

calculating a first time duration which is a time from transmission of a message from the control device in the circuit switch domain to a time the message arrives at a remote end communication terminal;

generating a comparison result by comparing the calculated first time duration with a predetermined second time duration, the second time duration being a time from transmission of a message from the control device in the circuit switch domain to a time the message arrives at a local communication terminal; and determining, by the control device in the circuit switch domain, an order and time for transmitting a request of session handover to a device anchoring VoIP conversation and transmitting a request of cell handover to the control device in the packet switch domain based on the comparison result of the first time duration and the second time duration, and transmitting the two requests according to the order and time, to ensure that the request of session handover arrives at the remote end communication terminal at substantially the same time as the request of cell handover arrives at the local communication terminal.

2. The method according to claim 1, wherein, said calculation further comprises: the control device in the circuit switch domain transmits a request message of non-session handover request to the device anchoring VoIP conversation; the device anchoring VoIP conversation interacts with the remote end communication terminal after receiving the request message; and the device anchoring VoIP conversation transmits a reply message to the control device in the circuit switch domain after interacting with the remote end communication terminal; and the control device in the circuit switch domain calculates the first time duration in according to the time of transmitting the request message and the time of receiving the reply message.

3. The method according to claim 2, said calculation further comprises: based on the time of transmitting the request message and the time of receiving the reply message, the control device in the circuit switch domain calculates the first time duration as a certain proportion of the time duration between the two times.

4. The method according to claim 1, wherein, said determination further comprises: if the first time duration is longer than the second time duration, the control device in the circuit switch domain transmits a request of session handover to the device anchoring VoIP conversation; the control device in the circuit switch domain initiates a timer with a time interval being the difference of the first time duration and the second time duration; and after the timer expires, the control device in the circuit switch domain transmits a request of cell handover to the control device in the packet switch domain.

5. The method according to claim 1, wherein, said determination further comprises: if the first time duration is shorter than the second time duration, the control device in the circuit switch domain transmits a request of cell handover to the control device in the packet switch domain; the control device in the circuit switch domain initiates a timer with a time interval being the difference of the second time duration and first time duration; and after the timer expires, the control device in the circuit switch domain transmits a request of session handover to the device anchoring VoIP conversation.

6. The method according to claim 1, wherein, said determination further comprise: if the first time duration is equal to the second time duration, the control device in the circuit switch domain transmits a request of cell handover to the control device in the packet switch domain and a request of session handover to the device anchoring VoIP conversation simultaneously.

7. The method according to claim 1, wherein, the control device in the circuit switch domain is a MSC server or a Media GateWay MGW.

8. An apparatus in a control device in a circuit switch domain for reducing break duration in a handover of a VoIP conversation, comprising:

a receiver that receives a request of handover from a control device in a packet switch domain, the request indicating a handover of a current conversation from the packet switch domain to the circuit switch domain;

a processor configured to:

calculate a first time duration which is a time from transmission of a message from the control device in the circuit switch domain to a time the message arrives at a remote end communication terminal;

generate a comparison result by comparing the calculated first time duration with a predetermined second time duration, the second time duration being a time from transmission of a message from the control device in the circuit switch domain to a time the message arrives at a local communication terminal;

determine, based on the comparison result, an order and time for transmitting a request of session handover to a device anchoring VoIP conversation and transmitting a request of cell handover to the control device in the packet switch domain, to ensure that the request of session handover arrives at the remote end communication terminal at substantially the same time as the request of cell handover arrives at the local communication terminal; and a transmitter transmitting the two requests, according to the determined order and time for transmitting a request of session handover to the device anchoring VoIP conversation, and transmitting a request of cell handover to the control device in the packet switch domain.

9. The apparatus according to claim 8, wherein, the transmitter transmits a request message of non-session handover request to the device anchoring VoIP conversation; the receiver receives a reply message sent by the device anchoring VoIP conversation to the control device in the circuit switch domain after interacting with the remote end communication terminal; and the processor calculates the first time duration in according to the time of transmitting the request message and the time of receiving the reply message.

10. The apparatus according to claim 9, wherein, the processor calculates the first time duration as a certain proportion of the time duration between the two times in according to the time of transmitting the request message and the time of receiving the reply message.

11. The apparatus according to claim 8, wherein, if the comparison result indicates that the first time duration is longer than the second time duration, the processor triggers the transmitter to transmit a request of session handover to the device anchoring VoIP conversation, initiates a timer with a time interval being the difference of the first time duration and the second time duration, and triggers the transmitter to transmit a request of cell handover to the control device in the packet switch domain after the timer expires.

12. The apparatus according to claim 8, wherein, if the comparison result indicates that the first time duration is shorter than the second time duration, the processor triggers the transmitter to transmit a request of cell handover to the control device in the packet switch domain, initiates a timer with a time interval being the difference of the second time duration and the first time duration, and triggers the transmitter to transmit a request of session handover to the device anchoring VoIP conversation after the timer expires.

13. The apparatus according to claim 8, wherein, if the comparison result indicates that the first time duration is equal to the second time duration, the processor triggers the transmitter to transmit a request of cell handover to the control device in the packet switch domain and a request of session handover to the device anchoring VoIP conversation simultaneously.

14. The apparatus according to claim 8, wherein, the control device in the circuit switch domain is a MSC server or a Media GateWay MGW.

\* \* \* \* \*